United States Patent
Vijayan et al.

(10) Patent No.: US 11,934,967 B2
(45) Date of Patent: *Mar. 19, 2024

(54) PROVIDING COMPONENT RECOMMENDATION USING MACHINE LEARNING

(71) Applicant: Tekion Corp, Pleasanton, CA (US)

(72) Inventors: Jayaprakash Vijayan, Dublin, CA (US); Ved Surtani, Gurgaon (IN); Nitika Gupta, Bengaluru (IN); Pratheek Manjunath Bharadwaj, Mysore (IN); Indrajit Saha, Panagarh Bazar (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,028

(22) Filed: Mar. 22, 2023

(65) Prior Publication Data

US 2023/0222365 A1   Jul. 13, 2023

Related U.S. Application Data

(63) Continuation of application No. 17/403,477, filed on Aug. 16, 2021.

(51) Int. Cl.
*G06Q 30/0601* (2023.01)
*G06N 5/04* (2023.01)
(Continued)

(52) U.S. Cl.
CPC ............ *G06N 5/04* (2013.01); *G06N 20/00* (2019.01); *G06Q 10/20* (2013.01); *G06Q 30/016* (2013.01);
(Continued)

(58) Field of Classification Search
CPC .......... G06N 5/04; G06N 20/00; G06Q 10/20; G06Q 30/016; G06Q 30/0202; G06Q 30/0631

See application file for complete search history.

(56) References Cited

U.S. PATENT DOCUMENTS 9,747,611 B2 *   8/2017   Battista ............. G06F 16/24578
2016/0364783 A1 * 12/2016   Ramanuja .......... G06Q 30/0625
(Continued)

FOREIGN PATENT DOCUMENTS

WO   WO 2016/187129 A1   11/2016
WO   WO-2016187129 A1 *  11/2016   ............ B60W 40/09

OTHER PUBLICATIONS

Tang, Personalized Top-N Sequential Recommendation via Convolutional Sequence Embedding (Year: 2018).*

(Continued)

*Primary Examiner* — Sangeeta Bahl
(74) *Attorney, Agent, or Firm* — Fenwick & West LLP

(57) ABSTRACT

A management system operates in conjunction with entities to provide component recommendations for objects. The management system trains a machine learning model used to generate the component recommendations. The machine learning model is trained based on historical component entries describing components previously provided and identifiers of the components. The management system generates training data by classifying the historical component entries into predetermined component classifications. After the machine learning model is trained, the management system generates a customized recommendation of components for an object based on likelihoods of selection of the predetermined component classifications.

20 Claims, 7 Drawing Sheets

(51) Int. Cl.
*G06N 20/00* (2019.01)
*G06Q 10/20* (2023.01)
*G06Q 30/016* (2023.01)
*G06Q 30/0202* (2023.01)

(52) U.S. Cl.
CPC ..... *G06Q 30/0202* (2013.01); *G06Q 30/0631* (2013.01)

(56) References Cited

U.S. PATENT DOCUMENTS

| | | | |
|---|---|---|---|
| 2020/0005196 A1 | 1/2020 | Cai et al. | |
| 2020/0013022 A1* | 1/2020 | Lewis | G06F 40/284 |
| 2020/0126326 A1 | 4/2020 | Lavie | |
| 2020/0311680 A1 | 10/2020 | Wahl et al. | |
| 2021/0224723 A1 | 7/2021 | Kinsey et al. | |
| 2021/0233164 A1* | 7/2021 | Gaur | G06Q 30/0641 |
| 2022/0004568 A1 | 1/2022 | Patil et al. | |
| 2022/0067667 A1* | 3/2022 | Mahipal | G06Q 10/20 |
| 2022/0165104 A1* | 5/2022 | Gardiner | G06Q 10/063112 |

OTHER PUBLICATIONS

Huaige, Z., "Automobile After-sales Service Management Countermeasures with Customer Value Based," *2010 3rd International Conference on Information Management, Innovation Management and Industrial Engineering*, Kunming, China, 2010, pp. 134-137, doi:10.1109/ICIII.2010.38.

Final Office Action, U.S. Appl. No. 17/403,477, filed Jun. 29, 2022, 26 pages.

Non-final Office Action, U.S. Appl. No. 17/403,477, filed Oct. 27, 2022. 31 pages.

Non-final Office Action, U.S. Appl. No. 17/403,477, filed Feb. 24, 2022, 23 pages.

* cited by examiner

| | Entity ID | User ID | Object ID | Date/Time | Service Identifier | Identifier Description | Service Description |
|---|---|---|---|---|---|---|---|
| 1 | 1 | J. Doe | WMQR | 2020/03/02 01:55:02 | BRK | Ut augue metus... | Lorem ipsum dolor sit amet, consectetur adipiscing... |
| 2 | 67 | D. Smith | LJXX | 2019/11/11 02:42:54 | 18955 | Nam aliquam... | Morbi congue est vitae vestibulum venenatis. Morbi... |
| 3 | 4 | A. Williams | JZ6P | 2020/12/30 19:03:55 | BRAKE | non congue... | Curabitur lacinia iaculis erat, eu sollicitudin velit luctus nec... |
| 4 | 3 | T. Jackson | X4JS | 2018/09/23 19:35:21 | B004 | Aliquam erat... | Fusce aliquet consectetur varius... |
| 5 | 32 | L. Jones | 2AKN | 2019/07/22 17:15:04 | XUG3 | Vestibulum at... | Maecenas consequat, orci a sollicitudin pretium, nibh nibh... |
| ... | ... | ... | ... | ... | ... | ... | ... |
| N | 28 | M. Richards | KMYV | 2021/03/13 20:29:02 | BKR | Donec non... | Donec ut elementum justo, eget auctor leo... |

Access a plurality of historical service entries of a plurality of different entities
510

↓

Generate training data by classifying each of the plurality of historical service entries into at least one of a plurality of predetermined service classifications
520

↓

Train a machine learning model using the generated training data to predict for each of the plurality of predetermined service classifications a likelihood of selection
530

↓

Receive a request for service of an object of a user
540

↓

Apply attributes of the object to the trained machine learning model
550

↓

Determine a recommended set of services for the object
560

↓

Provide the recommended set of services for the object
570

Access a first plurality of historical component entries of a plurality of different entities
610

Access a second plurality of historical component entries of the plurality of different entities
620

Generate training data by classifying each of the first plurality and the second plurality of historical component entries into at least one of a plurality of predetermined component classifications based on an identifier included in each of the plurality of historical component entries
630

Train a machine learning model using the generated training data to predict for each predetermined component classification a likelihood of selection of a component corresponding to the predetermined component classification
640

Receive a request for service on an object of a user at an entity
650

Apply attributes of the object to the trained machine learning model
660

Determine a recommended set of components provided by the entity based on predicted likelihoods
670

Provide the recommended set of components
680

FIG. 6

PROVIDING COMPONENT RECOMMENDATION USING MACHINE LEARNING

CROSS-REFERENCE TO RELATED APPLICATION

This application is a continuation of U.S. patent application Ser. No. 17/403,477 filed on Aug. 16, 2021, which is incorporated by reference in its entirety.

BACKGROUND

Field of Disclosure

The present disclosure generally relates to a management system connected to a plurality of entities that provide services on objects, and more specifically to generating training datasets for machine learning models and training the machine learning models to generate recommendations of services on objects and components for objects.

Description of the Related Art

A management system stores information related to a plurality of different entities (e.g., automobile dealers) that provide various services and/or components to users (e.g., services and/or accessories for users' automobiles) where the services and components are related to objects associated with the users (e.g., automobiles). Although the different entities may provide similar types of services and/or components for the objects, each entity may have their own unique identifiers for the services and components. Thus, conventional management systems have to be uniquely configured for each entity to provide recommendations for services and/or components that are in accordance with the identifiers of the services and/or components that are specific to the entity.

SUMMARY

A management system performs service identifier standardization for different services for objects to generate a training dataset for a machine learning (ML) model. The management system accesses historical service entries of objects performed by different entities where each entity uses different identifiers to represent the same type of service performed by the entities. The training dataset is generated by categorizing the historical service entries from the different entities into predetermined classifications of services in order to standardize the services. The predetermined classifications of services may be representative of commonly offered services from the different entities within a particular industry. Thus, the predetermined classifications of services are applicable across multiple different entities that provide the services represented by the predetermined classifications.

After the training dataset is generated, the management system trains a machine learned (ML) model using the generated training dataset. The trained ML model is configured to receive attributes associated with an object of a user as input and output a prediction of selection for each of the predetermined service classifications. Since the trained ML model was trained using the historical service entries of multiple entities where the entries have been classified into the predetermined classifications of services, the trained ML model can be used to generate recommendations of services for different entities rather than require a uniquely trained ML model for each entity.

During deployment of the trained ML model, the management system receives a request to generate service recommendations for an object based on attributes associated with the object. The management system applies the trained ML model to the attributes and receives a likelihood of selection for each of the predetermined types of services. The management system provides a recommendation to the user including one or more predetermined types of services based on the predictions.

In one embodiment, the management system may also provide a customized recommendation for components (e.g., accessories) associated with the user's object (e.g., an automobile) based on attributes of the object. The recommendation for components may be provided when recommended services for the object are provided in one embodiment. The management system accesses historical component entries corresponding to components previously provided to other users by a plurality of entities. The historical component entries are classified into one or more predetermined component classifications that represent categories of different types of components. Classifying the historical component entries into the predetermined component classifications standardizes the types of components available at the different entities.

The management system trains an ML model using a training dataset including the classified historical component entries. Since the trained ML model was trained using the historical component entries of multiple entities where the entries have been classified into the predetermined classifications of components, the trained ML model can be used to generate recommendations of components for different entities rather than require a uniquely trained ML model for each entity.

The ML model is trained to receive attributes associated with the object as input and output predictions (i.e., likelihoods) of the user selecting different predetermined component classifications while the object is being serviced. Based on the outputted likelihoods, the management system identifies one or more components offered by the entity that correspond to the predicted predetermined component classifications to include in a recommendation for the user.

BRIEF DESCRIPTION OF DRAWINGS

FIG. 3 illustrates an example set of historical service entries, according to one embodiment.

FIG. 5 is a flow diagram illustrating an example process of training and applying a machine learning model to provide service recommendations, according to one embodiment.

FIG. 6 is a flow diagram illustrating an example process of training and applying a machine learning model to provide component recommendations, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
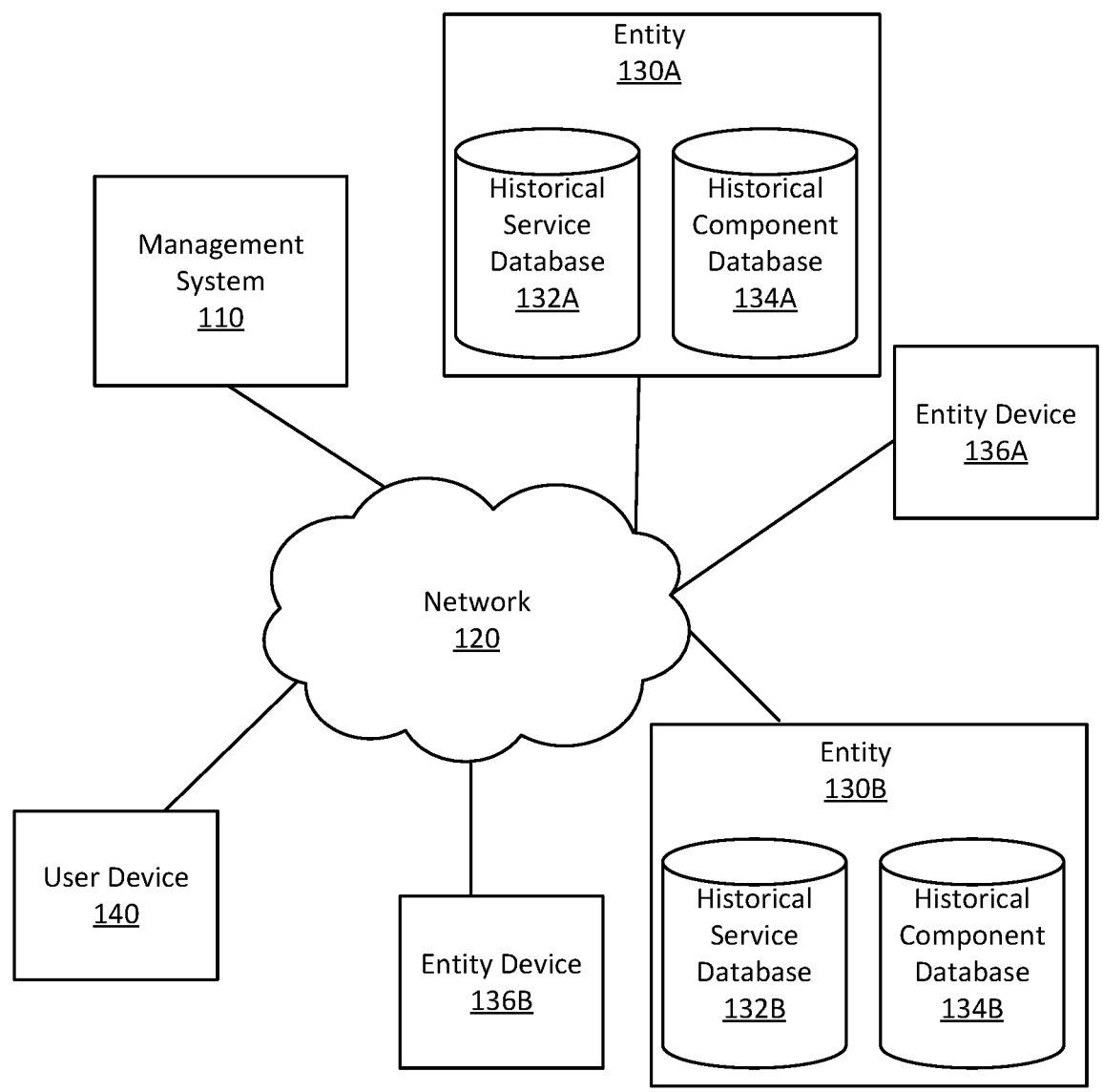
FIG. 1 is a high-level block diagram illustrating an environment for providing customized recommendations of services and/or components for objects of users, according to one embodiment.

FIG. 1 is a high-level block diagram illustrating an environment 100 for providing customized recommendations of services and/or components for objects of users, according to one embodiment. The environment 100 includes a management system 110, a first entity 130A, a second entity 130B, a first entity device 136A associated with the first entity 130A, a second entity device 136B associated with the second entity 130B, and a user device 140 that are connected to each other via a network 120. While two instances of entities 130A and 130B (also referred to as "entity 130" or "entities 130"), two instances of entities devices 136A and 136B (also referred to as "entity device 136" or "entity devices 136"), and a single instance of the user device 140 are illustrated in FIG. 1, there may be additional instances.

The network 120 provides a communication infrastructure among the management system 110, the entities 130, the entity devices 136, and the user device 140. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The user device 140 and the entity device 136 may include any device having an application that can communicate with each other, the management system 110, entity 130A, and/or entity 130B. Examples of such a device include a mobile device, a tablet, or a personal computer. The user device 140 is a device of a user used to communicate with the management system 110 and/or the one or more entities 130 to request services and/or components for the user's object. The entity device 136 is a device used by personnel associated with the corresponding entity 130 to communicate with users or to perform other administrative tasks associated with the entity 130.

Each of the first entity 130A and the second entity 130B provides various services and components related to objects of users. In one embodiment, an entity 130 is an automobile dealership that provides services on automobiles (e.g., an object) owned by users. Non-limiting examples of services for objects available at the entity 130 include automobile-related services such as oil and filter change, car wash, engine air filter replacement, cabin air filter replacement, coolant hose replacement, brake pad replacement, fuel injection servicing, battery service, and automatic transmission flush.

In one embodiment, the entity 130 stores data associated with services performed by the entity on objects as entries in a historical service database 132 located at the entity 130. For example, an entry associated with a service includes an identity of a user associated with the object that was serviced by the entity 130, attributes of the object, time and date of the service, identity of an employee of the entity 130 that performed the service, cost associated with the service, parts used during the service, an internal identifier representing the service where the identifier is unique to the entity 130, a general description for the identifier, a service description provided by the employee that performed the service, or other relevant information regarding the service. While the embodiments described herein are described in the context of automobile dealerships, the techniques described herein are applicable to any context where users may receive customized recommendations of services or components.

In one embodiment, the management system 110 is connected to a plurality of entities 130 and generates customized recommendations of services for users of the entities 130 based on patterns in historical services provided by the entities 130. In one embodiment, a machine learned (ML) model is trained to generate the service recommendations for a particular user given attributes of the user's object. The ML model may be trained based on generated training data that is generated from data stored in the historical service databases 132 of the plurality of entities 130.

However, each of the entities 130 are independent of each other and do not use a standard identifier system for identifying types of services offered by the different entities although the entities perform similar types of services. For example, entity 130A and entity 130B may both perform an oil service on an automobile, but each entity may have a different internal identifier for the oil service. The service management system 110 accesses a subset of historical entries that have already been classified with predetermined service classifications and then expands training data by automatically classifying additional historical entries into the predetermined service classifications. By classifying the historical services entries across the multiple entities 130 using the predetermined service classifications, the service management system 110 standardizes the internal identifiers used by the different entities 130 that are unique to each of the different entities. After generating the training data, the service management system 110 trains an ML model to predict likelihoods of selection of different services and a recommendation for services for the particular user is generated based on the predicted likelihoods. Details on training and applying the ML model for service recommendation is described below with respect to FIG. 2.

In addition to services, the entity 130 may also provide components (e.g., accessories) associated with the objects of users. Continuing with the automobile dealership example, automobile-related components or accessories provided by the entity 130 include floor liners, assist steps, bed protection, splash guards, floor mats, and wiper blades. When the entity 130 provides (e.g., sells) an accessory for an automobile to a user, the entity 130 stores data associated with the transaction such as attributes of the automobile (e.g., make, model, year), date and time of transaction, and services that were provided with the accessory in the historical component database 134. The management system 110 trains an ML model based on historical component entries to predict likelihoods of users selecting predetermined component classifications and uses likelihoods to select sets of components to recommend to users. Details on training and applying the ML model for component recommendation is described below with respect to FIG. 2.

Management System

Figure 2:
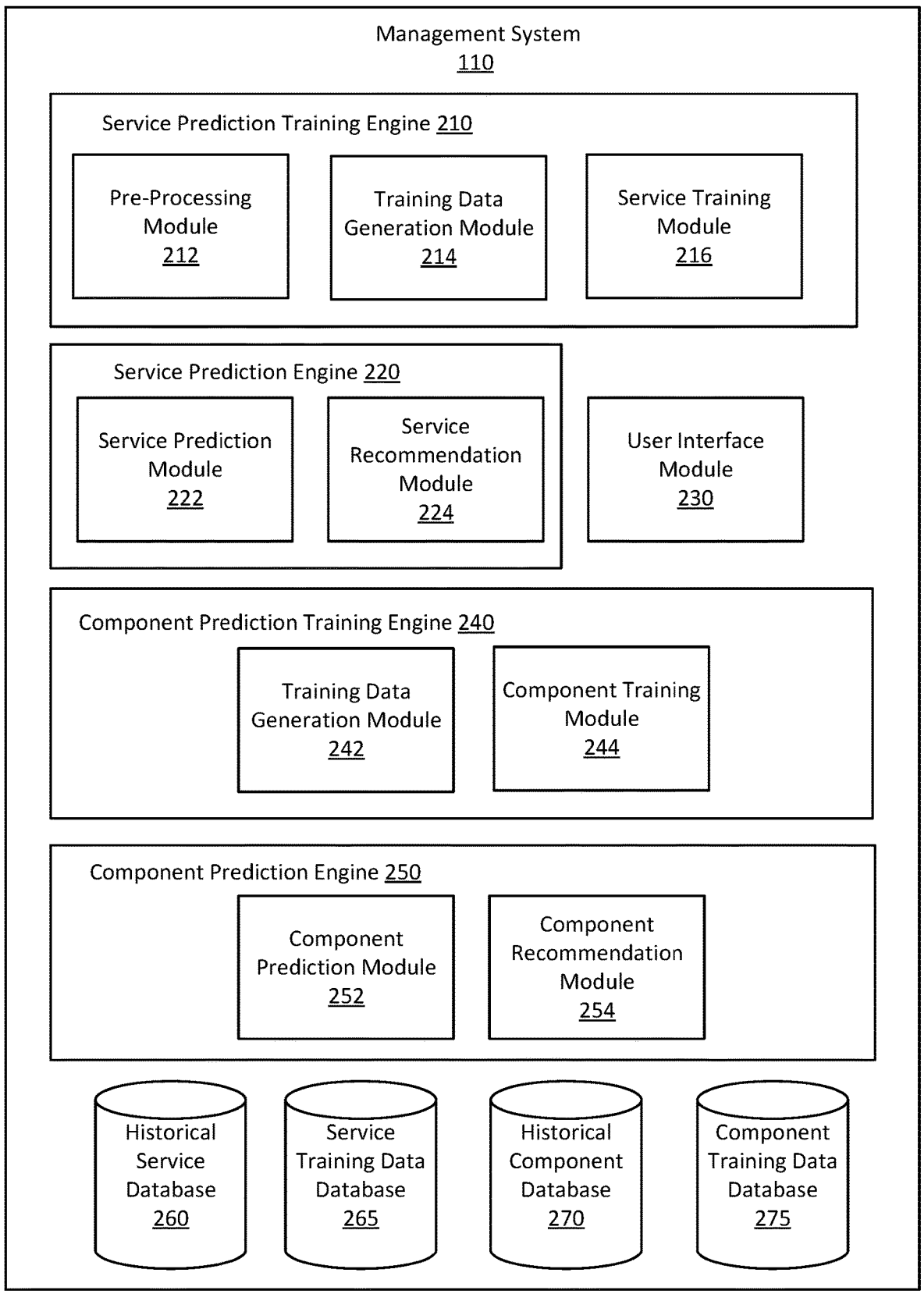
FIG. 2 is a high-level block diagram illustrating a detailed view of a management system, according to one embodiment.

FIG. 2 is a high-level block diagram illustrating a detailed view of a management system 110, according to one embodiment. In one embodiment, the management system 110 includes a service prediction training engine 210, a service prediction engine 220, a user interface module 230, a component prediction training engine 240, a component prediction engine 250, a historical service database 260, a service training data database 265, a historical component database 270, and a component training data database 275. Note that in other embodiments, the management system 100 may include other modules and/or databases than those illustrated in FIG. 2.

Service Prediction

The service prediction training engine 210 trains the service prediction engine 220 to predict one or more services that a user is likely to select for an object associated with the user. For example, the service prediction engine 220 may predict services available at an entity 130 (e.g., an automobile dealership) that may be selected by a user to be performed on the user's automobile. In one embodiment, the service prediction training engine 210 includes a pre-processing module 212, a training data generation module 214, and a service training module 216. However, the service prediction training engine 210 may include other modules in different embodiments.

The pre-processing module 212 accesses historical service entries stored in the historical service database 260 and pre-processes data in the historical service entries prior to using the entries to generate training data used for training the service prediction engine 220. The historical service database 260 includes a plurality of historical service entries from one or more entities 130.

Each historical service entry includes text data describing one or more historical services previously performed by an entity 130 on an object of a user. Examples of text data included in a historical service entry include an identifier of the service (e.g., an opcode) that is unique to the entity 130 that provided the historical service, an identifier description that includes a general description of the type of service that is associated with the identifier, and a service description provided by the service provider (e.g., a technician) that performed the service. In one embodiment, the historical service entries may be retrieved from the historical service databases 132 of the entities 130 connected to the management system 110 and stored in the historical service database 260 of the management system 110.

FIG. 3 illustrates an example set of historical service entries 300 stored in the historical service database 260, according to one embodiment. The example set 300 includes N historical service entries that are stored in the historical service database 260. As shown in the columns, each entry includes an entity ID, a user ID, an object ID, a date and time of the service, service identifier, a description of the service identifier, and a service description. In one embodiment, the entity ID identifies the entity 130 that provided the service corresponding to the entry, the user ID identifies the user associated with the object that was serviced by the entity, and the object ID identifies the object on which the service was performed (e.g., VIN number of the automobile). The date and time indicates when the service was provided by the entity. The service identifier is a unique identifier used by the entity 130 to represent the type of the service, and the identifier description is a summary of the service. The service description are notes specific to the service that was performed on the corresponding object. The service description may be input by a service provider associated with the entity 130 (e.g., mechanic, agent). In other embodiments, fewer, different, or additional types of information may be included in the historical service entries.

Referring back to FIG. 2, the pre-processing module 212 pre-processes the plurality of historical service entries prior to the historical service entries being used to create training data. Generally, the pre-processing module 212 parses the historical service entries to identify and correct any informalities identified in the historical service entries. By pre-processing the historical service entries, outcomes of the training data generation module 214 are improved. The pre-processing module 212 may pre-process the text data included in a historical service entry by performing one or more of: applying spell check to correct typographical errors identified in the historical service entry such as in the service description, formatting the historical service entry such that all letters in the text of the historical service entry are lower case, converting any numbers included in the service description to text (e.g., replace "100" with "hundred"), removing any special characters in the service description, removing punctuation in the service description, and removing stop words in the service description (e.g., a, an, the, and, or).

The training data generation module 214 generates training data used to train the service prediction engine 220. The training data generated by the training data generation module 214 is based on the pre-processed historical service entries and are classified with one or more predetermined service classifications. In one embodiment, the predetermined service classifications are fixed categories of services commonly provided by different entities 130 in a given industry (e.g., automobile industry). By classifying the historical service entries from multiple entities 130 with the predetermined service classifications, the training data generation module 214 standardizes the service identifiers of the different entities 130 that are included in the historical service entries. In one embodiment, the predetermined service classifications may be determined by experts of the industry.

In one embodiment, the training data generation module 214 generates training data based on common variations of service identifiers from different entities 130. That is, different entities 130 may use different identifiers to represent a service performed by the entities. The training data generation module 214 accesses a list of service identifiers known to be used by different entities 130. In one embodiment, the list of common variations of service identifiers includes a mapping of each of a plurality of service identifies used by different entities 130 to at least one predetermined service classification from the plurality of predetermined service classifications.

The training data generation module 214 compares a service identifier identified in a historical service entry to the list to identify a match between the service identifier from the historical service entry and a service identifier in the list. Responsive to a match, the training data generation module 214 determines one or more predetermined service classifications from the list that map to the matched service identifier in the list and classifies the historical service entry with the determined one or more predetermined service classifications. For example, for a predetermined service classification of "brake replacement," many entities 130 in the automobile industry may use internal identifiers "BRAKE," "BRK," or "BR" as the service identifier that represents the service within the entities 130. The training data generation module 214 may parse a historical service entry to determine when one of these identifiers is included in the entry and compare the identifiers to the list. As a result of the comparison, the training data generation module 214 may classify the entry as "brake replacement" (e.g., the predetermined service classification).

Figure 4:
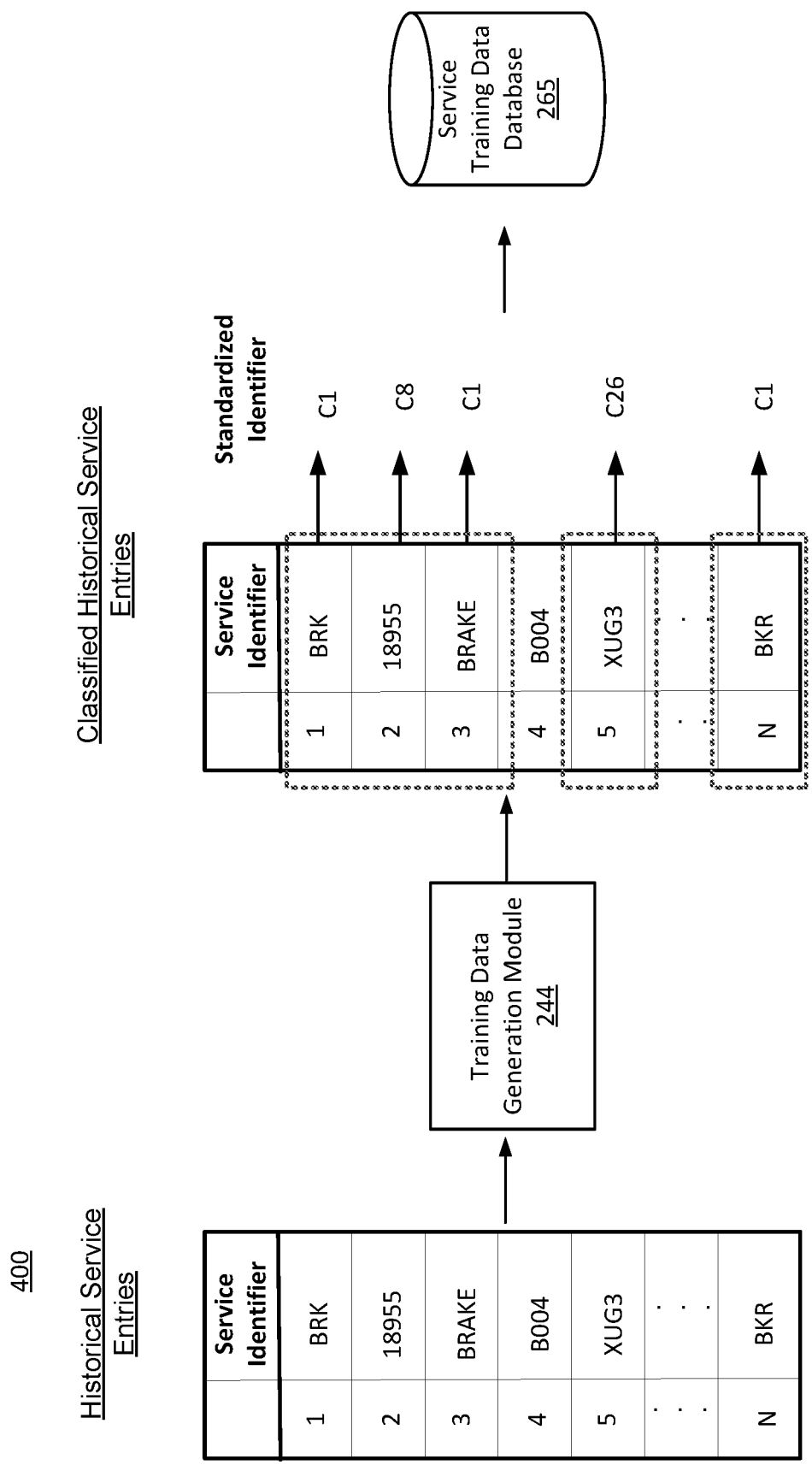
FIG. 4 illustrates an example process of generating training data for service recommendations, according to one embodiment.

FIG. 4 illustrates an example process 400 of classifying historical service entries, according to one embodiment. In the example process 400, the example set of historical service entries 300 of FIG. 3 is provided to the training data generation module 214 of the management system 100 that determines the predetermined service classification (e.g., C1 through C30) corresponding to the entries in the example set 300. For example, "C1" corresponds to "brake replacement, "C2" corresponds to "oil and filter change," "C3" corresponds to "car wash," and so on.

As described above, the training data generation module 214 maps known variations of identifiers to a predetermined service classification. The training data generation module 214 may access the list including mappings of commonly used service identifiers to the standardized predetermined service classifications. For example, commonly known variations of the predetermined service classification "C1" may include "BRK" and "BRAKE" which are identifiers unique to different entities 130. Therefore, the training data generation module 214 may classify entry 1 and entry 3 as "C1."

The training data generation module 214 may be unable to classify all of the historical service entries using the mapping described above. In one embodiment, the training data generation module 214 accesses a pre-classified training dataset having a plurality of pre-classified service entries. The pre-classified service entries are historical service entries from different entities 130 where each pre-classified service entry is already classified with one or more of the predetermined service classifications. In one embodiment, the pre-classified service entries are previously classified by annotators (e.g., employees of the management system 100) with one or more of the predetermined service classifications. The annotators may review the text in the subset of historical service entries and identify one or more predetermined service classifications that map to the services described in the historical service entries. Because manually reviewing and annotating services entries is not efficient, a relatively small number of entries (e.g., 2,000 entries) are manually classified. In one embodiment, entries classified into the predetermined service classifications based on the list of common variations of service identifier are also included in the pre-classified training dataset.

In one embodiment, the training data generation module 214 further generates training data based on similarities of the historical service entries in the remaining entries that could not be classified and the pre-classified training data set. The training data generation module 214 may determine a similarity between non-classified historical service entries and classified historical service entries using term frequency-inverse document frequency (TF-IDF) algorithm, for example.

The classified historical service entries may be divided into different groups where each group is associated with a corresponding one of the plurality of predetermined service classifications. In one embodiment, the training generation module 214 compares each unclassified historical service entry with the classified historical service entries in each group using TF-IDF. The training generation module 214 determines for each unclassified historical service entry the group having classified historical service entries that has the highest degree of match using TF-IDF based on the comparison. Responsive to the similarity being greater than a threshold, the training generation module 214 assigns the predetermined service classification of the group to the unclassified service classification. In another embodiment, the training generation module 214 determines for each unclassified historical service entry one or more different groups having classified historical service entries that each have a degree of match that is above a threshold based on the comparison and assigns the predetermined service classifications of the one or more groups to the unclassified service classification.

The classified historical service entries are then added to the service training data database 265 to be used for training the component prediction training engine 240. For example, referring back to the example in FIG. 4, the training data generation module 214 determines that for entry 5 having a service identifier of "XUG3," the similarity between entry 5 and a pre-classified historical service of C26 is the highest and greater than the predetermined threshold. After being classified as "C26," entry 5 is added to the service training data database 265.

In one embodiment, one or more entries in the example set 300 cannot be mapped to a predetermined service classification. For example, the greatest similarity for entry 4 may not exceed a predetermined threshold, which indicates that entry 4 is not similar to any of the pre-classified historical service entries. Therefore, entry 4 cannot be classified with sufficient confidence and is not included in the service training data database 265 that is used to train the service prediction engine 220. Thus, responsive to the greatest similarity being less than the predetermined threshold, the unclassified historical service entry may not be similar enough to any of pre-classified historical service entry and may not be included in the service training data database 265.

Referring back to FIG. 2, the service training module 216 trains an ML model of the service prediction engine 220 to predict likelihoods of users selecting services for objects where the services are represented by the predetermined service classifications. The service training module 216 trains the ML model of service prediction engine 220 using the generated training data stored in the service training data database 265.

In one embodiment, the service training module 216 extracts attributes from the classified historical service entries in the training data for training the service prediction engine 220. The extracted attributes may characterize the objects on which the historical services were performed. Returning to the automobile example, for an entry associated with a historical service performed on an automobile, extracted attributes related to the automobile may include the predetermined service classification assigned to the entry, make, model, year, engine characteristics (e.g., horsepower, torque), MSRP, market class (e.g., two door sedan, four door sedan, two-seater), total mileage, average distance driven per year, or options installed (e.g., sunroof, heated seats).

The decisions for selecting services for objects depend not only on characteristics of the objects but also user behavior. In one embodiment, the service training module 216 also extracts attributes of users associated with the objects. The classified historical service entries in the training data may identify the users associated with the objects, and the service training module 216 may retrieve attributes of the users from user profiles managed by the entities 130 to be used for training the service prediction engine 220. The entities 130 may store attributes of the users that receive services from the entities 130 in the user profiles.

An example category of user attributes is demographic information. For example, when an entity 130 sells an automobile to a user or checks a user in for an appointment, the entity 103 collects demographic information from its users. In one embodiment, the demographic information includes at least one of age, residence information (e.g., home address), family size, education level, or marital status. Another example category of user attributes is historical activities. Historical activities may include historical services received by the user at the entity 130, spending information associated with services, parts, or accessories purchased from the entity 130, date of each purchase, and total amount spent during each transaction. Another example category of user attributes is driving information. In one embodiment, driving information includes the last known mileage of an automobile owned by a user and an accident history of the automobile. The accident history may describe the number of accidents that the automobile was involved in, mileage of the automobile at the time of each accident, and any descriptive information about the accident (e.g., total loss, bumper damage, etc.).

In one embodiment, the service training module 216 may have direct access to the demographic information, the historical activity information, and the driving information of the users served by the entities 130. That is, the service training module 216 may directly access the user profiles managed by the entities 130 and retrieve the demographic information, the historical activity information, and the driving information. Alternatively, the service training module 216 may submit a request to the entities 130 for access to the demographic information, the historical activity information, and the driving information and receive the requested information responsive to the request.

In one embodiment, the service training module 216 trains the ML model using the random forest algorithm. In other embodiments, the service training module 216 may train the ML model using other machine learning algorithms such as neutral networks, support vectors, or logic regression.

Once the service training module 216 has trained the ML model, the service training module 216 may use a validation dataset including a subset of the historical service entries in the service training data database 260 that were not used for the training to test the accuracy of the ML model. The service training module 216 may apply the attributes of entries in the validation dataset to the ML model and determine whether the ML model outputs a likelihood greater than or equal to a predetermined threshold for one or more classifications that the respective entries were labeled with. For example, when attributes of an entry classified as "oil and filter change" from the validation dataset is provided as input to the ML model, and the ML model outputs a likelihood (e.g., 80%) that is greater than or equal to a predetermined threshold (e.g., 75%) for "oil and filter change" classification, the service training module 216 determines that the ML model has made an accurate prediction. Conversely, for the same attributes, if the ML model outputs a likelihood (e.g., 30%) less than the predetermined threshold for "oil and filter change" classification, the service training module 216 may determine that the ML model has made an inaccurate prediction. In another embodiment, other methods may be used to determine the accuracy of the ML model.

In one embodiment, the service training module 216 updates the ML model if the accuracy is below a threshold accuracy for the validation dataset (e.g., 90% accuracy). The service training module 216 may update the ML model by adjusting the weights of the features for the ML model. The service training module 216 may iteratively update the ML model until it can predict the likelihoods with the threshold accuracy. Once the service training module 216 has trained the ML model to have the threshold accuracy, the ML model is considered to be trained.

In one embodiment, the service training module 216 periodically retrains the ML model using recent historical service entries that have been classified into the plurality of predetermined service classifications. By periodically retraining the ML model, the service training module 216 can improve the recommendation capabilities of the ML model. In one embodiment, the service training module 216 retrains the ML model after a threshold amount of time has elapsed since the last training (e.g., every 3 months). Alternatively, the service training module 216 retrains the ML model after a threshold number of new historical service entries are stored in the service training data database 265.

Once the service prediction engine 220 is trained, the service prediction engine 220 is configured to generate service recommendations for objects of users. In one embodiment, the service prediction engine 210 includes a service prediction module 222 and a service recommendation module 224. The service prediction engine 210 may include other modules in other embodiments.

In one embodiment, the service prediction module 222 includes the trained ML model that is configured to predict likelihoods of a given user selecting services corresponding to the predetermined service classifications. In one embodiment, the service prediction module 222 receives a request for service for an object. The request may include attributes of the object and/or the user. The request may also include a requested data and time for an appointment of the service.

In one embodiment, the request is received from the user device 140 associated with the user. For example, the user may schedule the appointment with the entity 130 through the management system 110. In another embodiment, the request is received from the entity 130 responsive to the entity 130 receiving the request from the user device 140. The request may identify a specific service to perform on the user's object. However, the user may be unaware of other types of services that are offered by the entity 130 that may be beneficial for the user's object or may not realize that the user's object is due for another type of service. Therefore, the management system 110 generates service recommendations that includes other services that the user is likely to be interested in.

The service prediction module 222 extracts relevant attributes associated with the object and/or the user from the request. In one embodiment, the service prediction module 222 also creates additional attributes from the attributes included in the request. The attributes may be created from attributes included in the request. For example, the request may include the current mileage of the vehicle and the service prediction module 222 may generate an average mileage per year attribute. In another example, the service prediction module 222 may generate attributes regarding the frequency of visits by the user to the entity 130 associated with the request, the amount of money spent per visit at the entity, and statistics regarding the money spent such as the standard deviation of the money spent. The service prediction module 222 may also generate seasonality information that describes what season the user typically visits the entity 130.

In one embodiment, the service prediction module 222 inputs the attributes (e.g., extracted and generated attributes) to the trained ML model of the service prediction module 222. The service prediction module 222 applies the attributes to the trained ML model and outputs for each predetermined service classification a predicted likelihood that the type of service corresponding to the predetermined service classification will be selected by the user. In one embodiment, the likelihood is a value between 0 and 1.

The service recommendation module 224 receives the likelihoods determined by the service prediction module 222 and generates a recommendation including a plurality of services for a user to perform on the user's object. In one embodiment, the service recommendation module 224 ranks the predetermined service classifications based on the likelihoods, and selects the plurality of services that have the highest likelihoods of the user selecting them. For example, the service recommendation module 224 selects the top five service classifications output by the service prediction module 222.

In one embodiment, the service recommendation module 224 determines whether the user has received one or more services included in the top ranked services and removes those that have already been performed within a threshold time. For example, if the tires for an automobile were replaced 6 months prior, and one of the predetermined service classification corresponds to replacing or repairing tires, the service is not included in the recommendation.

The service recommendation module 224 transmits the recommendation to the user interface module 230 that generates a graphical user interface to present the recommendation. The recommendation may be presented to the user through the user device 140 and/or one or more entity devices 136. In one embodiment, the recommendation is provided to the user via the user device 140. The user interface module 230 generates a graphical user interface to present the recommendations to the user device 140 in response to user transmitting the request for service or when the user logs into a customer portal. The recommendation may also be presented to the user through one or more entity devices 136. In one embodiment, the recommendation is also provided to the entity 130, and an employee of the entity 130 may provide the recommendation to the user at multiple stages of user interactions (e.g., different instances). For example, the recommendation may be provided to the user when the user over the phone by the employee makes an appointment with or confirms an appointment with the entity 130 for service as described above. The recommendation may be provided again to the user when the user checks in with an agent of the entity 130 (e.g., on a tablet used to check in with the entity 130) for the appointment at the entity 130, when the user gives final confirmation to a technician of the entity 130 to begin servicing the user's object, and while the user is waiting in a service lounge for the technician to service the user's object (e.g., on a television in the service lounge).

Component Prediction

In addition to services, entities 130 may also recommend to users components related to the users' objects. In one embodiment, components include accessories for the object. For example, for an automobile object, accessories include apparel, license plate frames, floor mats, key chains, wiper blades, floor liners, assist steps, bed protection, splash guards, etc. When an entity 130 receives a request from a user device 140 for service on the user's object, the entity 130 may use the management system 110 to determine components to recommend to the user based on attributes of the user's object. Generally, the management system 110 applies a trained ML model to attributes of the object and determines a set of components to be recommended to the user. In one embodiment, the component recommendations are generated and provided with the service recommendations described above. The component recommendations may be generated in response to receiving the requests for services that also triggers the management system 110 to generate the service recommendations.

Referring back to FIG. 2, in one embodiment, the component prediction training engine 240 includes a training data generation module 242 and a component training module 244, and the component prediction engine 250 includes a component prediction module 252 and a component recommendation module 254. Generally, the component prediction training engine 240 trains the component prediction engine 250 to generate predictions of types of components that a user is likely to select for their object as will be further described below.

The training data generation module 242 accesses historical component entries stored in the historical component database 270 to generate training data used to train the component prediction engine 250. The historical component entries are records of transactions involving components for objects that were made between the entities 130 and the users. For example, the transactions may be accessory purchases made by the users for their automobiles from the entities 130. Each historical component entry includes an identifier indicating the type of the component (e.g., product name, product ID number). The historical component entries may also include a user identifier to identify a user associated with the historical component entry. In one embodiment, a user identifier is associated with a user profile at an entity 130.

In one embodiment, the historical component database 270 includes data retrieved from the historical component databases 134 of the entities 130 connected to the management system 110. In one embodiment, a first subset of the entries is from a first data source and a second subset of entries is from a second data source. Types of data included in the first subset of entries may be different from types of data included in the second subset of entries. For example, the first data source includes service departments of automobile dealerships that provide components along with services (e.g., windshield wiper provided to a user that brought in their automobile for an oil change). The second data source includes part departments of the automobile dealership that provides components for sale. Accordingly, the first subset of entries may include additional information regarding services that are not included in the second subset of entries. A particular entity 130 may provide entries for both the first subset and the second subset.

The training data generation module 242 classifies the historical component entries from the historical component database 270 into at least one of a plurality of component classifications. The plurality of predetermined component classifications are fixed classifications that components can be placed into. Non-limiting examples of predetermined component classifications for automobile accessories include floor liners, assist steps, bed protection, splash guards, floor mats, and wiper blades. The plurality of component classifications may be provided to the management system 110 by an expert or may be determined by personnel associated with the management system 110.

In one embodiment, the training data generation module 242 classifies the historical component entries into one or more of the predetermined component classifications based on a text analysis on the component identifiers. The training data generation module 242 analyzes identifiers and component descriptions of different components to identify keywords for the components and identify a predetermined component classification having a highest degree of match to the identified keywords. For example, a historical component entry includes a component identifier "Brand X Ultimate Contour Floor Liner." The training data generation module 242 may identify the terms "floor liner" and assign the entry to the "floor liner" classification. In another embodiment, the training data generation module 242 compares the component identifiers in the historical component entries to known mappings between component identifiers and the predetermined component classifications. Once the historical component entries are classified, the classified historical component entries are stored in the component training data database 275. In one embodiment, the component training data database 275 includes at least a threshold number of historical component entries for each of the predetermined component classifications (e.g., at least 100 entries for "floor liners," at least 100 entries for "assist steps").

The component training module 244 trains the component prediction engine 250 based on training data in the component training data database 275. The component training module 244 extracts attributes for each of the historical component entries in the training data to generate a feature vector representative of the historical component entry. The attributes may include attributes of objects associated with the historical component entries (e.g., make, model, year, engine characteristics, MSRP, market class (e.g., 4 door compact or 2 door compact), total mileage, and average distance driven per year). The attributes may include time and date of transaction, geographic location, and amount spent at the time of transaction. As described above, a first subset of entries in the component training data database 275 may include information regarding services that were provided at the same time as the components, and attributes for these entries may include types of services that were provided at the same time as the components. For the first subset of entries, the attributes may further include one or more types of services that were provided with the components.

In one embodiment, the component training module 244 trains the component prediction module 252 using the smart adaptive recommendations (SAR) algorithm. In other embodiments, the ML models may be trained using other methods such as random forest, neural networks, support vector machine (SVM), logistic regression, or boosting. To train the component prediction module 252, the component training module 244 applies the feature vectors that characterize the historical component entries in the component training data database 275 and corresponding predetermined component classifications. The component training module 244 trains the component prediction module 252 to learn a set of weights on attributes in the feature vectors so that the component prediction module 252 can predict likelihoods of users selecting the predetermined component classifications. That is, for each of the predetermined component classifications, the component prediction module 252 outputs for each predetermined component classification a likelihood of a user selecting the component classification. For example, the output of the trained component prediction module 252 for a user may be 80% for "floor mats," 23% for "floor liners," 54% for "assist steps," and so on for the remaining classifications.

Once the component training module 244 has trained the component prediction module 252, the component training module 244 may use a validation dataset including a subset of the entries in the component training data database 275 that were not used for the training to test the accuracy of the component prediction module 252. The component training module 244 may apply the feature vectors of entries in the validation dataset to the component prediction module 252, and determine whether the component prediction module 252 outputs a likelihood greater than a predetermined threshold for the one or more classifications that the respective entries were labeled with. For example, when a feature vector of an entry classified as "floor mats" is provided as input to the component prediction module 252, and the component prediction module 252 outputs a likelihood (e.g., 75%) that is greater than a predetermined threshold (e.g., 60%) for "floor mats," the component prediction module 252 may determine that the component prediction module 252 has made an accurate prediction. Conversely, for the same feature vector, if the component prediction module 252 outputs a likelihood (e.g., 30%) less than the predetermined threshold for "floor mats," the component prediction module 252 may determine that the component prediction module 252 has made an inaccurate prediction. In another embodiment, other methods may be used to determine the accuracy of the trained component prediction module 252.

In one embodiment, the component training module 244 updates the component prediction module 252 if the accuracy of the component prediction module 252 is below a threshold accuracy for the validation dataset used for testing accuracy (e.g., 90% accuracy). The component training module 244 may update the component prediction module 252 by adjusting the weights of the features for the ML model. The component training module 244 may iteratively update the component prediction module 252 until it can predict the likelihoods with the threshold accuracy. Once the component training module 244 has trained the component prediction module 252 to have the threshold accuracy, the component prediction module 252 is considered to be trained.

In one embodiment, the component training module 244 periodically retrains the component prediction module 252 using recent historical component entries that have been classified into the plurality of predetermined component classifications. By periodically retraining the component prediction module 252, the component training module 244 can improve the recommendation capabilities of the component prediction module 252. In one embodiment, the component training module 244 retrains the component prediction module 252 after a threshold amount of time has elapsed since the last training (e.g., every 3 months). Alternatively, the component training module 244 retrains the component prediction module 252 after a threshold number of new historical component entries are stored in the historical component database 270.

After the component prediction module 252 is trained, the component prediction engine 250 can generate component recommendations for users making requests to entities 130 for services on objects. In one embodiment, when a user associated with an object makes a request to an entity 130 to perform a service on the object, the management system 110 determines which components to recommend to the user based on attributes of the object. The request includes attributes of the object and indicates an entity to provide the service. For example, a request may indicate that user A is making an appointment for service from dealership A to replace tires of their 2013 Honda Civic automobile with a mileage of 80,000 miles.

After being trained, the component prediction module 252 predicts likelihoods of a particular user associated with an object selecting the plurality of predetermined component classifications at the time of the request for service or requests for component recommendations. The predictions indicate for each predetermined component classification how likely it is for the user to select the predetermined component classification. The component prediction module 252 provides attributes of the object as input to the trained ML model and receives the likelihoods as output. In one embodiment, the component prediction module 252 provides additional attributes such as type of service indicated in the request, time and date of request, geographic location of the user, and types of service requested. For example, attributes such as "year=2013," "make=Honda," "model=Civic," "total distance=80,000 miles," "requested service=brake replacement," "location=California," and "date=1/1/2021" are input to the trained ML model, and the resulting output is 80% for "floor mats," 23% for "floor liners," and 54% for "assist steps." However, the probabilities correspond to predetermined component classifications rather than particular products that can be recommended to the user.

The component recommendation module 254 receives the likelihoods output from component prediction module 252 and determines a set of components that are offered by the entity 130 that is providing service to the user's object based on the likelihoods. In one embodiment, for a given user, the component recommendation module 254 ranks the plurality of component classifications according to the likelihoods and select a threshold number of component classifications (e.g., top 6 component categories). In another embodiment, the component recommendation module 254 compares the output likelihoods to a predetermined threshold, and selects the component classifications with likelihoods that exceed the predetermined threshold.

The component recommendation module 254 then selects one or more component for each selected predetermined component classification that are provided by the entity 130. The component recommendation module 254 may retrieve a set of components provided by the entity 130 that correspond to the selected component classifications. Different entities 130 have different inventory and preferences for product brands and product models to offer to users, so the component recommendation module 254 customizes the recommendations based on the components available at the entity 130. For example, the recommended set of components may be selected based on an entity profile within the management system 110 that indicates preferred component suppliers of the entity or component catalog associated with the entity. That is, if a user sends identical requests to the first entity 130A and the second entity 130B, a first recommended set of components provided to the user in response to the request to the first entity 130A may be different from a second recommended set of components provided to the user in response to the request to the second entity 130B.

In one embodiment, the component recommendation module 254 identifies components that were previously provided to a user and times at which the components were provided based on historical activity of the user. The component recommendation module 254 retrieves the historical activity from user profiles managed by the entities 130. The component recommendation module 254 may determine whether the recommended set of components include one or more of the components that have previously been provided to the user within a threshold time period. If the component recommendation module 254 determines that one or more components that were provided to the user within the threshold time period are in the recommended set of components, the component recommendation module 254 may remove the one or more components. In one embodiment, the threshold time period may depend on the component classification. For example, the threshold time period for wiper blades may be 6 months while a threshold time period for floor mats may be 5 years.

In one embodiment, the component recommendation module 254 sends the recommended set of components to the user interface module 230 that generates a graphical user interface to present the recommendation to the user via the client device 140 (e.g., when the user makes an appointment online, when the user logs into a customer portal). The set of component recommendations may be provided with the set of service recommendations discussed above. The graphical user interface may enable the user to select one or more components and one or more services of interest from the recommendations, and the graphical user interface may be updated to display a total amount associated with the selections.

In one embodiment, the recommendation is provided to the entity 130 via the entity device 136, and the entity 130 provides the recommended components to the user. When the recommended set of components is provided to the entity 130, the entity 130 may review the recommended set of components and present the options to the user at multiple stages during the user's visit with the entity (e.g., when the user checks in with the entity 130 for the appointment, when entity 130 begins providing the requested service, while the user is waiting in a service lounge of the entity 130). In one embodiment, the recommendation for the set of components and the recommended services includes a total cost for the set of components and the recommended services.

In one embodiment, a user that reviews the recommended set of components may indicate a preference for one or more components by "liking" the components on the graphical user interface yet do not obtain the components from the entity 130. Similarly, the user may indicate a preference for one or more components by adding a recommended component to a checkout cart on the graphical user interface yet do not obtain the components from the entity 130. As a result, the indicated preference may cause the entity 130 and/or management system 110 to transmit follow up reminders to the user device 140 to obtain the component from the entity.

The recommendations generated by the component prediction engine 250 may prompt the entity 130 to obtain more components if the recommended components are low in stock. Furthermore, the recommended set of services may cause the entity 130 to begin carrying new components that were not previously carried based on the recommendations.

Training and Applying an ML Model for Service Recommendation

FIG. 5 is a flow diagram 500 illustrating an example process of training and applying an ML model to provide service recommendations, according to one embodiment. A management system accesses 510 a plurality of historical service entries of a plurality of different entities. Each historical service entry includes a description of a service performed on an object by an associated entity (e.g., storyline text provided by a mechanic of a dealership that performed service on a automobile) and an identifier of the service that is unique to the associated entity (e.g., unique operation code used by the dealership).

The management system generates 520 training data by classifying each of the plurality of historical service entries into at least one of a plurality of predetermined service classifications based on the description of each of the plurality of historical service entries. The predetermined service classifications may represent categories of services that are commonly provided by the plurality of service providers in a given industry. Using the training data, the management system trains 530 an ML model to predict for each of the plurality of predetermined service classifications a likelihood of selection of a service corresponding to the predetermined service classification. In one embodiment, the ML model is a random forest classifier trained to output for each predetermined service classification a probability of the user selecting the predetermined service classification.

During deployment, the management system receives 540 a request for service of an object of a user at an entity. In one embodiment, the request for service may be generated by the user and sent to the user's entity to perform the service on the object. For example, a customer of an automobile dealership may send a request to the automobile dealership to schedule for maintenance for their automobile. Responsive to receiving the request from the customer, the automobile dealership may send the request including attributes of the automobile and request the management system to determine a recommended set of services to present to the customer. In another embodiment, the request for service may be sent directly to the management system by the user.

Responsive to receiving the request, the management system applies 550 attributes of the object to the trained machine learning model. In one embodiment, the management system may also use attributes of the user to determine the recommended set of service. Based on the predicted likelihood of selection for each of the plurality of predetermined service classifications, the management system determines 560 a recommended set of services for the object. In one embodiment, the management system ranks the predetermined service classifications based on the probabilities and select a threshold number of the predetermined service classifications with the highest probabilities to recommend to the user. In one embodiment, the management system provides 560 the recommended set of services to the user. In another embodiment, the management system provides 560 the recommended set of services to the entity indicated in the request for service for the entity to pass the recommendation to the user.

Training and Applying an ML Model Component Recommendation

FIG. 6 is a flow diagram illustrating an example process 600 of training and applying an ML model to provide component recommendations, according to one embodiment. A management system accesses 610 a first plurality of historical component entries of a plurality of different entities, where each of the first plurality of historical component entries includes an identifier of the component and an identifier of a service performed on the object. The management system accesses 620 a second plurality of historical component entries of the plurality of different entries, where each of the second plurality of historical component entries includes an identifier of the component but not an identifier of a service performed on the object. For example, the first plurality of historical component entries may be from a service department of the automobile dealerships that provide both services and accessories while the second plurality of historical component entries are from a parts department of automobile dealerships that provides parts and accessories.

The management system generates 630 training data for an ML model by classifying each of the first plurality and second plurality of historical component entries into at least one of a plurality of predetermined component classifications. Based on the generated training data, the management system trains 640 an ML model to predict for each of the plurality of predetermined component classifications a likelihood of selection of a component corresponding to the predetermined component classification.

After the ML model has been trained, the management system receives 650 a request for service on an object of a user at an entity. The request includes attributes of the object. For example, the user may be requesting service from a particular automobile dealership to replace tires of their automobile, and the attributes of the automobile may include characteristics of the automobile such as make, model, year, horsepower, torque, MSRP, and market class.

The management system applies 660 the attributes of the object to the trained ML model, and the ML model predicts likelihoods of selection of each of the plurality of predetermined component classifications. The predicted likelihoods indicate the likelihoods of the user selecting various categories of components, and the management system determines 670 a recommended set of components provided by the entity based on the likelihoods. The management system provides 680 the recommended set of components. In one embodiment, the recommended set of components is presented to the user making the request. In another embodiment, the recommended set of components is presented to the entity indicated in the request.

Hardware Components

Figure 7:
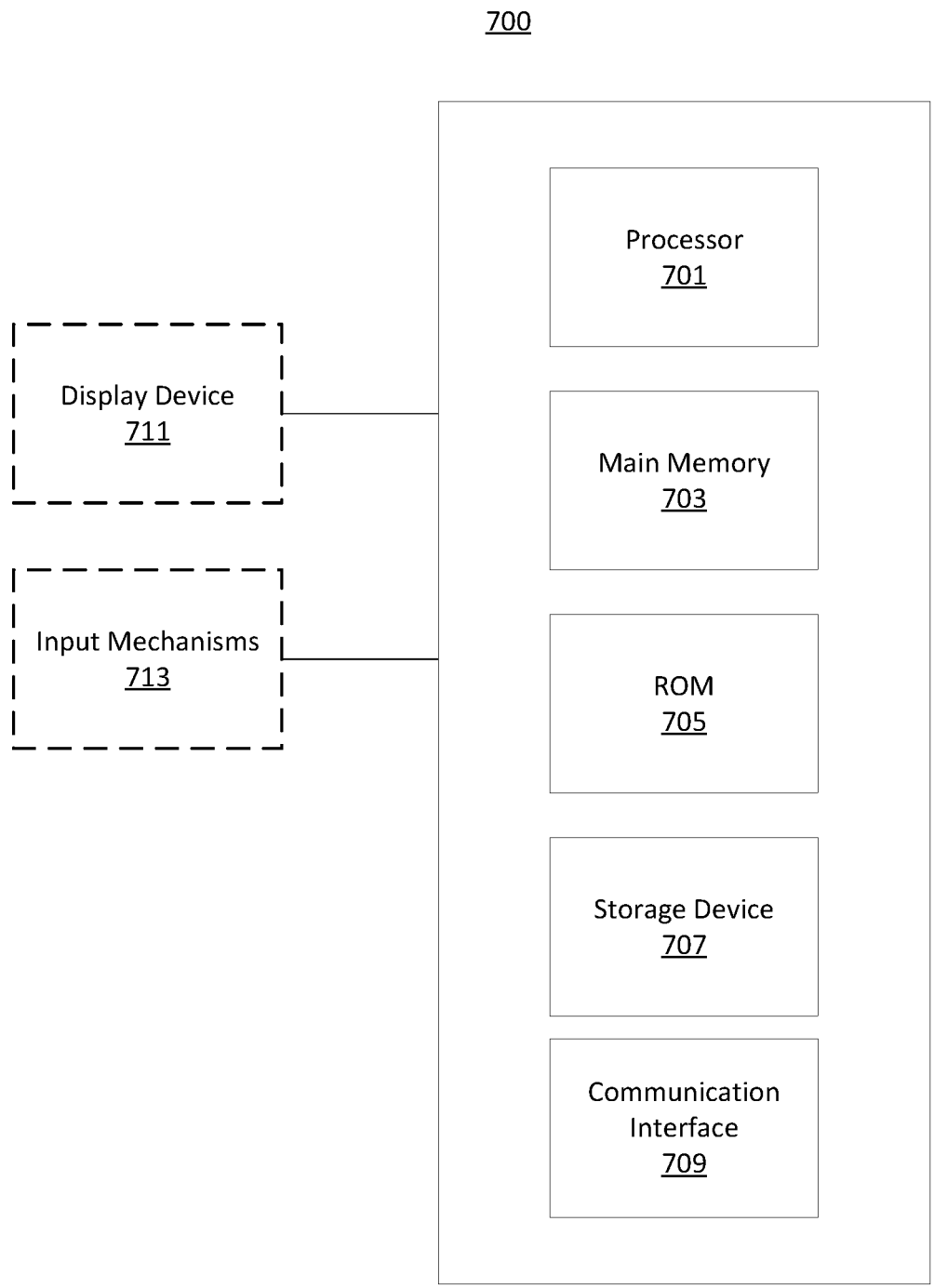
FIG. 7 is system diagram of a computer system, according to one embodiment.

FIG. 7 is system diagram of a computer system, according to one embodiment. FIG. 7 illustrates a computer system 700 upon which embodiments described herein may be implemented within the management system 110, the entities 130, the entity devices 136, and the user device 140. For example, in the context of FIG. 1, the management system 110, the entities 130, the entity devices 136, and the user device 140 may each be implemented using a computer system such as described by FIG. 7. The management system 110 and/or the entities 130 may also be implemented using a combination of multiple computer systems as described by FIG. 7.

In one implementation, the management system 110, the entities 130, the entity devices 136, and the user device 140 each include a processor 701, main memory 703, read only memory (ROM) 705, storage device 707, and a communication interface 709. The management system 110, the entities 130, the entity devices 136, and the user device 140 each includes at least one processor 701 for processing information and a main memory 703, such as a random access memory (RAM) or other dynamic storage device, for storing information and instructions to be executed by the processor 701. In one embodiment, multiple processors are employed by the management system 110 to perform the techniques described above in order to improve efficiency of the management system 100 and reduce computation time when generating the customized recommendations. Main memory 703 also may be used for storing temporary variables or other intermediate information during execution of instructions to be executed by processor 701. The management system 110, the entities 130, the entity devices 136, and the user device 140 may each also include ROM 705 or other static storage device for storing static information and instructions for processor 701. The storage device 707, such as a magnetic disk or optical disk or solid state memory device, is provided for storing information and instructions.

The communication interface 709 can enable each of the management system 110, the entities 130, the entity devices 136, and the user device 140 to communicate with each other through use of a communication link (wireless or wireline). Each of the management system 110, the entities 130, the entity devices 136, and the user device 140 can optionally include a display device 711, such as a cathode ray tube (CRT), an LCD monitor, an LED monitor, OLED monitor, a TFT display or a television set, for example, for displaying graphics and information to a user. An input mechanism 713, such as a keyboard that includes alphanumeric keys and other keys, can optionally be coupled to the computer system 700 for communicating information and command selections to processor 701. Other non-limiting, illustrative examples of input mechanisms 713 include a mouse, a trackball, touch-sensitive screen, or cursor direction keys for communicating direction information and command selections to processor 701 and for controlling cursor movement on display device 711.

Examples described herein are related to the use of the management system 110, the entities 130, the entity devices 136, and the user device 140 for implementing the techniques described herein. According to one embodiment, those techniques are performed by each of the management system 110, the entities 130, the entity devices 136, and the user device 140 in response to processor 701 executing one or more sequences of one or more instructions contained in main memory 703. Such instructions may be read into main memory 703 from another machine-readable medium, such as storage device 707. Execution of the sequences of instructions contained in main memory 703 causes processor 701 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular attribute, structure, or characteristic is included in at least one embodiment of the disclosure. The appearances of the phrase "in one embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. A computer-implemented method for generating recommended components for an object of a user comprising:
accessing, by a management system, a first plurality of historical component entries of a plurality of different entities, wherein each of the first plurality of historical component entries includes an identifier of a component of an object previously purchased by a respective user and an identifier of a service previously performed on the object at a respective entity from the plurality of different entities after the purchase of the object, the component of the object acquired in conjunction with the service being previously performed on the object;
training, by the management system, a machine learning model using training data that is based at least in part on the identifier of the component of the object and the identifier of the service included in each of the first plurality of historical component entries, the trained machine learning model configured to predict for each of a plurality of predetermined component classifications a likelihood of selection of a component corresponding to one of the plurality of predetermined component classifications;

receiving, by the management system, a request for a service to be performed on the object previously purchased by the user at an entity from the plurality of different entities, the request including attributes of the object that was previously purchased by the user and a specific service for the entity to perform on the object at the entity;

applying, by the management system, the attributes of the object to the trained machine learning model responsive to the request, the trained machine learning model outputting for each of the plurality of predetermined component classifications a prediction of the likelihood of user selection of the component corresponding to the predetermined component classification based on the attributes of the object applied to the trained machine learning model;

determining, by the management system, a recommended set of components for the object that are provided by the entity based on the prediction for each of the plurality of predetermined componenet classications; and providing, by the management system, the recommended set of components for the object to acquire by the user in conjunction with the specific service that was requested by the user being performed on the object at the entity along with a response to the request for the service.

2. The computer-implemented method of claim 1, wherein the prediction for each of the plurality of predetermined component classifications is a value indicative of a likelihood of selection of the component corresponding to the predetermined component classification by the user.

3. The computer-implemented method of claim 2, wherein determining the recommended set of components further comprises:

selecting a subset of the plurality of predetermined component classifications having values greater than a threshold; and determining for each predetermined component classification included in the subset, a component supplier that is preferred by the entity and at least one component provided by the component supplier that corresponds to the predetermined component classification, wherein the recommended set of components includes the determined at least one component from the preferred component supplier for each predetermined component classification included in the subset.

4. The computer-implemented method of claim 1, further comprising:

accessing, by the management system, a second plurality of historical component entries of the plurality of different entities, wherein each of the second plurality of historical component entries includes an identifier of a component of an object associated with the second historical component entry but does not include an identifier of a service performed on the object, the component of the object acquired by a respective user from a respective entity from the plurality of different entities after purchase of the object without the service being performed on the object at the respective entity; and generating, by the management system, the training data by classifying each of the first plurality of historical component entries and each of the second plurality of historical component entries into at least one of the plurality of predetermined component classifications based on the identifier of the component of the object included in each of the first plurality of historical component entries and the identifier of the component included in each second plurality of historical component entries.

5. The computer-implemented method of claim 4, wherein training the machine learning model comprises:

extracting features from each of the first plurality of historical component entries and each of the second plurality of historical component entries included in the training data, the extracted features including a predetermined component classification assigned to each of the first plurality of historical component entries and each the second plurality of historical component entries, features of the objects included in the first plurality of historical component entries, features of services performed on the objects included in the first plurality of historical component entries, and features of the components included the first plurality of historical component entries and the second plurality of historical component entries, wherein the machine learning model is trained using the extracted features.

6. The computer-implemented method of claim 4, wherein classifying each of the first plurality of historical component entries and each of the second plurality of historical component entries comprises:

identifying, for each of the first plurality of historical component entries and each of the second plurality of historical component entries, a keyword included in the respective historical component entry;

comparing, for each of the first plurality of historical component entries and each of the second plurality of historical component entries, the keyword with the plurality of predetermined component classifications to identify a match between the keyword and at least one of the plurality of predetermined component classifications; and classifying each of the first plurality of historical component entries and each of the second plurality of historical component entries with their respective matching predetermined component classification.

7. The computer-implemented method of claim 4, wherein classifying each of the first plurality of historical component entries and each of the second plurality of historical component entries comprises:

accessing a list of identifiers of components of the plurality of different entities, the list including a mapping of each of the identifiers of components to one or more of the plurality of predetermined component classifications;

comparing the identifier of the component included in each of the first plurality of historical component entries and each of the second plurality of historical component entries to the list, the comparison resulting in a match between identifiers of the components from the first plurality of historical component entries and the second plurality of historical component entries and the identifiers of components in the list; and classifying each of the first plurality of historical component entries and each of the second plurality of historical component entries with the predetermined component classification based on the match.

8. The computer-implemented method of claim 1, wherein the machine learning model is trained using Smart Adaptive Recommendations (SAR) algorithm.

9. The computer-implemented method of claim 1, wherein the management system provides the recommended set of components to a client device of the user a plurality of instances including responsive to the request for service, upon check-in of the user at the entity for the service, and user confirmation to begin servicing the object.

10. The computer-implemented method of claim 1, wherein the management system provides the recommended set of components to the entity and the entity provides the recommended set of services to a client device of the user a plurality of instances including responsive to the request for service, upon check-in of the user at the entity for the service, and user confirmation to begin servicing the object.

11. The computer-implemented method of claim 1, wherein the object of the user is an automobile, the recommended set of components are accessories for the automobile, and the attributes of the object includes at least one of a make of the automobile, a model of the automobile, a year of the automobile, engine characteristics of the automobile, a manufacturer's suggested retail price (MSRP) of the automobile, and a market class of the automobile.

12. A non-transitory computer-readable storage medium storing executable code for generating recommended components for an object of a user, the code when executed by a computer processor causes the computer processor to perform steps comprising:
accessing, by a management system, a first plurality of historical component entries of a plurality of different entities, wherein each of the first plurality of historical component entries includes an identifier of a component of an object previously purchased by a respective user and an identifier of a service previously performed on the object at a respective entity from the plurality of different entities after the purchase of the object, the component of the object acquired in conjunction with the service being previously performed on the object;
training, by the management system, a machine learning model using training data that is based at least in part on the identifier of the component of the object and the identifier of the service included in each of the first plurality of historical component entries, the trained machine learning model configured to predict for each of a plurality of predetermined component classifications a likelihood of selection of a component corresponding to one of the plurality of predetermined component classifications;
receiving, by the management system, a request for a service to be performed on the object previously purchased by the user at an entity from the plurality of different entities, the request including attributes of the object that was previously purchased by the user and a specific service for the entity to perform on the object at the entity;
applying, by the management system, the attributes of the object to the trained machine learning model responsive to the request, the trained machine learning model outputting for each of the plurality of predetermined component classifications a prediction of the likelihood of user selection of the component corresponding to the predetermined component classification based on the attributes of the object applied to the trained machine learning model;
determining, by the management system, a recommended set of components for the object that are provided by the entity based on the prediction for each of the plurality of predetermined componenet classications; and
providing, by the management system, the recommended set of components for the object to acquire by the user in conjunction with the specific service that was requested by the user being performed on the object at the entity along with a response to the request for the service.

13. The non-transitory computer-readable storage medium of claim 12, wherein the prediction for each of the plurality of predetermined component classifications is a value indicative of a likelihood of selection of the component corresponding to the predetermined component classification by the user.

14. The non-transitory computer-readable storage medium of claim 13, wherein determining the recommended set of components further comprises:
selecting a subset of the plurality of predetermined component classifications having values greater than a threshold; and
determining for each predetermined component classification included in the subset, a component supplier that is preferred by the entity and at least one component provided by the component supplier that corresponds to the predetermined component classification, wherein the recommended set of components includes the determined at least one component from the preferred component supplier for each predetermined component classification included in the subset.

15. The non-transitory computer-readable storage medium of claim 12, wherein the code when executed by the computer processor causes the computer processor to perform further steps comprising:
accessing, by the management system, a second plurality of historical component entries of the plurality of different entities, wherein each of the second plurality of historical component entries includes an identifier of a component of an object associated with the second historical component entry but does not include an identifier of a service performed on the object, the component of the object acquired by a respective user from a respective entity from the plurality of different entities after purchase of the object without the service being performed on the object at the respective entity; and
generating, by the management system, the training data by classifying each of the first plurality of historical component entries and each of the second plurality of historical component entries into at least one of the plurality of predetermined component classifications based on the identifier of the component of the object included in each of the first plurality of historical component entries and the identifier of the component included in each second plurality of historical component entries.

16. The non-transitory computer-readable storage medium of claim 15, wherein training the machine learning model comprises:
extracting features from each of the first plurality of historical component entries and each of the second plurality of historical component entries included in the training data, the extracted features including a predetermined component classification assigned to each of the first plurality of historical component entries and each the second plurality of historical component entries, features of the objects included in the first plurality of historical component entries, features of services performed on the objects included in the first plurality of historical component entries, and features of the components included the first plurality of historical component entries and the second plurality of historical component entries, wherein the machine learning model is trained using the extracted features.

17. The non-transitory computer-readable storage medium of claim 15, wherein classifying each of the first plurality of historical component entries and each of the second plurality of historical component entries comprises:
identifying, for each of the first plurality of historical component entries and each of the second plurality of historical component entries, a keyword included in the respective historical component entry;
comparing, for each of the first plurality of historical component entries and each of the second plurality of historical component entries, the keyword with the plurality of predetermined component classifications to identify a match between the keyword and at least one of the plurality of predetermined component classifications; and
classifying each of the first plurality of historical component entries and each of the second plurality of historical component entries with their respective matching predetermined component classification.

18. The non-transitory computer-readable storage medium of claim 15, wherein classifying each of the first plurality of historical component entries and each of the second plurality of historical component entries comprises:
accessing a list of identifiers of components of the plurality of different entities, the list including a mapping of each of the identifiers of components to one or more of the plurality of predetermined component classifications;
comparing the identifier of the component included in each of the first plurality of historical component entries and each of the second plurality of historical component entries to the list, the comparison resulting in a match between identifiers of the components from the first plurality of historical component entries and the second plurality of historical component entries and the identifiers of components in the list; and
classifying each of the first plurality of historical component entries and each of the second plurality of historical component entries with the predetermined component classification based on the match.

19. The non-transitory computer-readable storage medium of claim 12, wherein the management system provides the recommended set of components to a client device of the user a plurality of instances including responsive to the request for service, upon check-in of the user at the entity for the service, and user confirmation to begin servicing the object.

20. A system for generating recommended components for an object of a user, comprising:
one or more computer processors; and
a non-transitory computer-readable storage medium storing code, the code when executed by the one or more computer processors cause the one or more computer processors to perform steps comprising:
accessing, by a management system, a first plurality of historical component entries of a plurality of different entities, wherein each of the first plurality of historical component entries includes an identifier of a component of an object previously purchased by a respective user and an identifier of a service previously performed on the object at a respective entity from the plurality of different entities after the purchase of the object, the component of the object acquired in conjunction with the service being previously performed on the object;
training, by the management system, a machine learning model using training data that is based at least in part on the identifier of the component of the object and the identifier of the service included in each of the first plurality of historical component entries, the trained machine learning model configured to predict for each of a plurality of predetermined component classifications a likelihood of selection of a component corresponding to one of the plurality of predetermined component classifications;
receiving, by the management system, a request for a service to be performed on the object previously purchased by the user at an entity from the plurality of different entities, the request including attributes of the object that was previously purchased by the user and a specific service for the entity to perform on the object at the entity;
applying, by the management system, the attributes of the object to the trained machine learning model responsive to the request, the trained machine learning model outputting for each of the plurality of predetermined component classifications a prediction of the likelihood of user selection of the component corresponding to the predetermined component classification based on the attributes of the object applied to the trained machine learning model;
determining, by the management system, a recommended set of components for the object that are provided by the entity based on the prediction for each of the plurality of predetermined componenet classications; and
providing, by the management system, the recommended set of components for the object to acquire by the user in conjunction with the specific service that was requested by the user being performed on the object at the entity along with a response to the request for the service.

* * * * *